UNITED STATES PATENT OFFICE 2,548,897

PROCESS FOR MELTING HAFNIUM, ZIRCONIUM, AND TITANIUM METALS

William J. Kroll, Corvallis, Oreg., assignor to the United States of America as represented by the Secretary of the Interior No Drawing. Application April 7, 1947, Serial No. 739,952

7 Claims. (Cl. 22—200)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to the treatment of metals in the molten state. It particularly relates to the melting of the group IVb metals of the periodic system of elements (as shown on page 311 of the Handbook of Chemistry and Physics, 19th edition, Chemical Rubber Publishing Co.), such as hafnium, zirconium, titanium, thorium, and their alloys.

Heretofore, there has been no satisfactory process for melting hafnium, zirconium, and titanium metals without embrittlement due to the introduction of impurities. All known oxygen base refractories readily react with these metals at elevated temperatures and contaminate them with oxygen. The method now in use for fusing these metals employs a direct current arc furnace, operated under a noble gas atmosphere or under vacuum, in which one electrode is a water-cooled tungsten rod and the other a water-cooled metal block upon which the lump of metal to be melted is placed. This method has certain disadvantages. The size of the metal charge is limited by the amount of current that can be used, which in turn, is dependent on the size of tungsten rods commercially available. Another disadvantage of the arc fusion method is that splashings occur which reach the tungsten rod and alloy with it. Overheating of the tungsten electrode occasionally takes place and the splashings, now alloyed with tungsten, melt and drop into the ingot and contaminate the ingot melt.

Accordingly, it is an object of this invention to provide a method of treating metals such as hafnium, zirconium, titanium, and thorium while in the molten state without introducing embrittling impurities. It is another object of this invention to provide suitable apparatus for the treatment of the group IVb metals at temperature about their melting points. Other objects and advantages will be apparent or will appear hereinafter.

These objects are accomplished in accordance with this invention whereby a process for the production of shaped articles of metals of the group consisting of hafnium, zirconium, titanium, thorium, and their alloys and involving the treatment of the selected metal in the molten state, under vacuum or in a noble gas atmosphere, is improved by carrying out said treatment in apparatus having in contact with said molten metal surfaces of the group of carbon, graphite, and high melting carbides whereby embrittling impurities are substantially precluded from the shaped article.

Suitable metals for treatment in accordance with this invention include hafnium, zirconium, titanium, thorium, their mutual alloys, and alloys with other metals in which they are present in relatively large proportions.

The term treatment is to be taken in the broad sense as including melting, molding, casting, alloying, and like processes involving the conversion of the metal to the molten or fused state by heating the metal to temperatures about its melting point, the handling and processing of the metal while in the molten or fused state, processes where the molten or fused metals are allowed to revert to the solid state, and the like.

Suitable apparatus for carrying out the treatment are those adapted to such operations by the art such as crucibles, agaitators, ladles, molds, conduits, and the like; and presenting to the metals, while melting, molten, fused, or solidifying a contact surface of suitable non-embrittling materials as hereinafter described.

Suitable non-embrittling contact surface materials for treating these metals at temperatures at and about their melting and fusion points include carbon, graphite, and high melting carbides, such as hafnium carbide, zirconium carbide, titanium carbide, tungsten carbide, molybdenum carbide, tantalum carbide, and the like, either singly or in combination with other carbides. The preferred material is graphite since this material is cheap and can be easily fabricated. Prior to use, it is desirable to degas graphite apparatus by heating to temperatures of about 1800 degrees centigrade under vacuum of about one micron. Carbide apparatus and the like can be prepared by impregnating porous graphite apparatus with zirconium or titanium under vacuum. The metal that soaks into the pores slowly forms as carbide. By repeated impregnation at high temperature, the molten metal contact surface of the apparatus can be transformed into carbide. Carbide apparatus can also be made by powder metallurgy; powders of metal and carbon of a grain size of about minus 200 mesh are briquetted with an organic binder, molded to the desired shape, and sintered above 2000 degrees centigrade in vacuo.

It is quite surprising that carbides, graphite, and carbon in general can be used as suitable crucible material for the fusion of hafnium, zirconium, titanium, and the like since it is well known that carbides of these metals can be made readily by mixing powders of the metal with carbon, briquetting the mixture, and heating the briquette to a high temperature. However, when graphite is used as the crucible material, the result is entirely different. The reaction can only take place at the interface between the carbon and the molten metal. Penetration of the metals into the carbon and diffusion of the carbon into the metals are limited by the relatively low solubility of the carbides in either carbon or the metal. The carbide formed on melting these metals in graphite apparatus appears to adhere to the crucible walls and grows into the fused metal. Carbide contamination depends for the most part on the contact surface area, time of contact, and the temperature. As the contamination is dependent on the surface of contact, small melts pick up relatively more carbon than large ones. The concentration of the contaminant is greater at the rim than at the center of an ingot due to the fact that carbides are formed only at the points of contact between the metal bath and the graphite.

In general, the melting of group IV$b$ metals and their alloys can be accomplished by suitable heating means which are capable of supplying sufficient heat to melt the metals, such as furnaces of the high frequency, metal or carbon resistor, or arc types. With the latter type, carbon electrodes may be employed in place of tungsten electrodes without causing appreciable carbon contamination. In order to prevent contamination of the metal by atmospheric components, the furnace may be operated under a noble gas atmosphere, or under a vacuum. When using a vacuum, care must be taken that carbon vapor, which forms at the melting temperature attained, does not contact hot oxide refractories of the furnace or its attachments. If this takes place, carbon monoxide forms and can react with the metals, thereby contaminating them with oxygen and carbon. This difficulty can be overcome by using shields to protect the oxide refractories. The shields can be made of oxide-free refractories like carbides or high melting metals such as molybdenum, tungsten, tantalum, and the like. The metals are preferred as they are easier to fabricate. It is also conceivably possible to exclude atmospheric contaminants by melting the metals under fused oxide free salt layers which are less dense than the molten metal, will not react chemically with the molten metal or apparatus, will not dissolve appreciably in the molten metal, and which will be in the liquid or fused state at the temperatures involved.

Metals melted in the above manner can be processed in any desired fashion, other metals can be added and alloys prepared, the metal may be cast into ingots and other shapes, or the metal can be permitted to solidify in the apparatus. As previously stated, the carbides formed in these meltings adhere to the walls of the crucible. It is possible, therefore, to obtain a product having only a slight carbon contamination by pouring the metal into a mold. Such castings can be made by the usual methods, either by pouring into a mold over the rim, ladling, or the use of tapholes. The molds may be of graphite, carbides, or of metal; but, in any case, should be sufficiently cold to prevent reaction or welding at the contact surface. Graphite molds are preferred as they are economical and the shapes can be easily removed from the mold.

The following examples show how the invention may be carried out, but it is not limited thereto.

*Example I*

A graphite crucible of dense, commercial grade graphite, made by turning on a lathe, was degassed at 1800 degrees centigrade in a vacuum. The crucible was filled with raw zirconium obtained by the reduction of zirconium chloride under helium. It was then placed in a high frequency vacuum furnace made of a silica tube, the walls of which were protected with split molybdenum metal shields cut from thin sheets of the metal. On heating, a slight evolution of gas was observed just at the melting point, possibly caused by a partial dissociation of residual nitride. The bath was held near the melting point until its surface appeared quiet and clean, a matter of a few minutes. The power was shut off and the crucible removed when cool. The graphite crucible and carbide skin were then removed from the ingot by turning on a lathe. Tests showed that the ingot had a carbon content of 0.12 percent and a Brinell hardness of 180.

Zirconium ingots fused on graphite can be cut readily with a handsaw as the carbide layer formed at the graphite contact surface is very thin. They can also be rolled very easily. A sheet 0.04 inch in thickness was made from material with a carbon content of 0.2 percent. The reduction between annealings was up to 50 percent by cold rolling. The metal is not hardened appreciably by carbon content up to one percent. In the rolled material, the carbides can be seen microscopically as inclusions arranged in the form of strings. Being brittle when cold, they break when cold rolled and orient themselves in the direction of rolling. In zirconium ingots with a carbon as low as 0.12 percent, carbide inclusions are visible indicating the low solubility of this compound in molten zirconium.

Ingots of zirconium 4½ inches in diameter were held in a molten state in a graphite crucible for a few minutes; contamination by carbion was very slight. The average carbon content of 12 ingots melted in this way was only 0.22 percent, with values as low as 0.12 percent. Remelts of the same ingots increased the carbon content very slightly.

Other metals and alloys of this group have been found to behave in a similar fashion.

From the foregoing, it is apparent that a desirable method has been provided for the melting of group IV$b$ metals and their alloys.

Since many widely differing embodiments of this invention will occur to one skilled in the art, it is not limited to the specific destails illustrated or described, and various changes can be made therein without departing from the spirit and scope thereof.

What is claimed is:

1. A method for the production of malleable ingots of the group IV$b$ metals and their alloys involving melting said metal in a degassed graphite crucible and transferring the molten metal to a cold mold.

2. A method for the production of malleable ingots of the group IV$b$ metals and their alloys involving excluding atmospheric contaminants, melting said metal in a degassed graphite crucible and transferring the molten metal to a cold mold.

3. The method of claim 2 wherein atmospheric contaminants are excluded by replacing said contaminants with a noble gas atmosphere.

4. The method of claim 2 wherein atmospheric contaminants are excluded by melting under vacuum.

5. A method for the production of a malleable ingot of a metal selected from the group consisting of the group IVb metals and their alloys which comprises, excluding atmospheric contaminants, melting said metal in a degassed graphite container and then solidifying said metal in said container.

6. The method of claim 5 wherein atmospheric contaminants are excluded by replacing said contaminants with a noble gas atmosphere.

7. The method of claim 5 wherein atmospheric contaminants are excluded by melting under vacuum.

WILLIAM J. KROLL.

REFERENCES CITED

The following references are of record in the file of this patent:

UNITED STATES PATENTS

| Number | Name | Date |
|---|---|---|
| 1,477,508 | Lohmann | Dec. 11, 1923 |
| 1,648,954 | Marden | Nov. 15, 1927 |
| 1,752,474 | Anderson | Apr. 1, 1930 |
| 1,776,053 | Voigtlander et al. | Sept. 16, 1930 |